(12) United States Patent
Guillet et al.

(10) Patent No.: US 7,426,101 B2
(45) Date of Patent: Sep. 16, 2008

(54) CONTAINER HAVING AN OVERPRESSURE SAFETY DEVICE

(75) Inventors: Dominique Guillet, Orsonnens (CH); Mariano Teira, Payerne (CH); Rolland Gallay, Farvagney-le-Petit (CH)

(73) Assignee: Maxwell Technologies, Inc., San Diego, CA (US)

( * ) Notice: Subject to any disclaimer, the term of this patent is extended or adjusted under 35 U.S.C. 154(b) by 317 days.

(21) Appl. No.: 11/381,220

(22) Filed: May 2, 2006

(65) Prior Publication Data

US 2007/0257045 A1 Nov. 8, 2007

(51) Int. Cl.
*H01G 2/00* (2006.01)
*H01G 2/12* (2006.01)
*H01G 2/10* (2006.01)

(52) U.S. Cl. .................. 361/272; 361/535; 361/517; 174/50

(58) Field of Classification Search ......... 361/502–503, 361/517–521, 535–538, 272, 275.1, 275.2
See application file for complete search history.

(56) References Cited

U.S. PATENT DOCUMENTS

| | | | |
|---|---|---|---|
| 4,617,611 A | | 10/1986 | Miura et al. |
| 5,148,347 A | * | 9/1992 | Cox et al. .................. 361/272 |
| 5,450,279 A | * | 9/1995 | Yoshida et al. ............. 361/502 |
| 6,310,756 B1 | * | 10/2001 | Miura et al. ............. 361/301.3 |
| 6,603,653 B2 | * | 8/2003 | Matsuoka et al. .......... 361/502 |

* cited by examiner

*Primary Examiner*—Eric Thomas
(74) *Attorney, Agent, or Firm*—Hensley Kim & Holzer, LLC

(57) ABSTRACT

In one embodiment, a container with an overpressure safety device comprises a wall having a depression in at least a portion of the wall that expands when the pressure inside the container exceeds a predetermined level. The container further comprises a clamp bridging over the depression and restraining the angular expansion of the depression, while at the same time enabling the depression to expand radially. As a consequence, the outer dimensions of the container remain essentially constant when the pressure inside the container exceeds the predetermined level. The container may be tubular in shape and the depression may be shaped like a groove extending parallel to the longitudinal axis of the container, while the clamp may be shaped like a bar affixed to the outer wall of the container in two or more points spaced angularly on opposite sides of the depression.

16 Claims, 2 Drawing Sheets

CONTAINER HAVING AN OVERPRESSURE SAFETY DEVICE

STATEMENT REGARDING FEDERALLY SPONSORED REASEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

The present invention concerns a container having an overpressure safety device, and, more particularly, a container having a depression that is capable of expanding radially when the pressure inside the container exceeds a predetermined level and that is restrained angularly by a clamp bridging over the depression.

2. Description of Related Art

Closed containers may explode when a gaseous material generated or contained inside the container increases in pressure beyond a predetermined level. Such a pressure increase may occur for a variety of reasons. For example, in electrical capacitors, gas may be generated by an electro-chemical decomposition process caused by the aging of the capacitor or by an improper usage of the capacitor. Such an increase in the internal pressure may be so rapid that an explosion of the capacitor may occur.

In the prior art, a weaker mechanical point is introduced in the capacitor container, so that a container wall opens incrementally when the internal pressure exceeds a predetermined level, that is, reaches an "overpressure" condition. If the container is tubular in shape, with a base and a cap enclosing the contained material, such a weaker mechanical point may be shaped like a longitudinal groove positioned on the tubular wall, or on the base or on the cap of the container. Such a groove is sometimes referred to in the industry as a "fuse" and may be provided by causing a local reduction in wall thickness during the manufacture of the container, or by a stamping process, or by an appropriate shaping of the tubular wall if the tubular wall is produced by extrusion, or by other methods.

Such a system of overpressure prevention system is not optimal. In the event of overpressure, the soft opening of the fuse is inversely proportional to capability of the fuse to expand under dynamic pressure conditions, and when the rate of pressure increase exceeds the soft opening capability of the fuse, the container wall may tear rapidly and the container may explode.

A solution to this problem may lay in increasing the thickness of the wall can, but that also causes an increase in container weight and cost, and also causes manufacturing problems when the cap is put on the container and joined with the tubular wall.

Therefore, there is a need for a container having an overpressure safety device enabling the container to expand incrementally while preventing an explosion of the container.

BRIEF SUMMARY OF THE INVENTION

In one embodiment, a container with an overpressure safety device comprises a wall having a depression in at least a portion of the wall that expands when the pressure inside the container exceeds a predetermined level. The container further comprises a clamp bridging over the depression and restraining the angular expansion of the depression, while at the same time enabling the depression to expand radially. As a consequence, the outer dimensions of the container remain essentially constant when the pressure inside the container exceeds the predetermined level.

The container may be tubular in shape and the depression may be shaped like a groove extending parallel to the longitudinal axis of the container, while the clamp may be shaped like a bar affixed to the outer wall of the container in two or more points spaced angularly on opposite sides of the depression.

BRIEF DESCRIPTION OF THE SEVERAL VIEWS OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIGS. 5A-5B are top views of a third embodiment of the invention, wherein there are two depressions and a single clamp encircling a portion of the container and constraining both depressions, wherein FIG. 5A illustrates a first variant of the third embodiment having more than two points where the clamp is affixed to the container wall, and wherein FIG. 5B illustrates a second variant of the third embodiment having only two points where the clamp is affixed to the container wall.

DETAILED DESCRIPTION OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
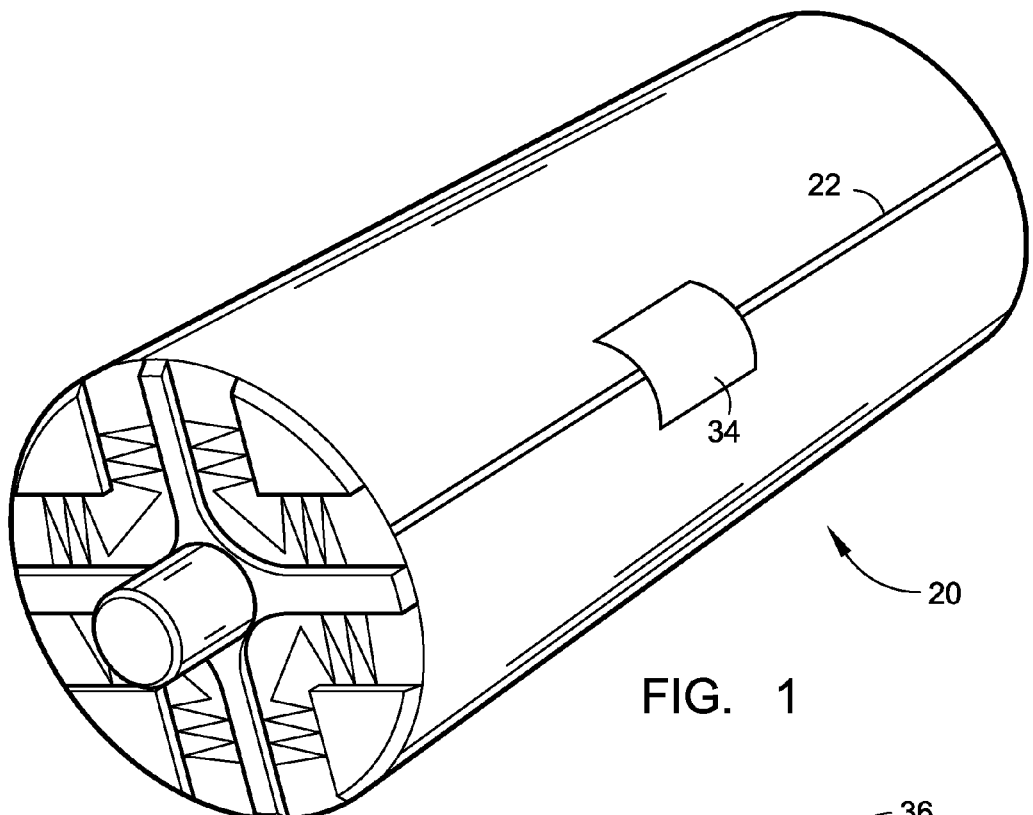
FIG. 1 is a perspective view of a first embodiment of the invention illustrating a container having a depression constrained by a clamp.

Turning first to FIG. 1, there is shown a first embodiment of the present invention. A container 20 is tubular in shape and comprises a depression 22 situated on a lateral wall 24. In the illustrated embodiment, depression 22 is shaped like a groove extending on a portion of wall 24 and in a direction parallel to the longitudinal axis of container 20.

Figure 2A:
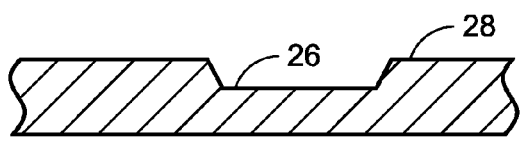
FIGS. 2A-2B are detailed views of alternative variants of the depression illustrated in FIG. 1.

Depression 22 may have different shapes. In the variant shown in FIG. 2A, depression 26 is characterized by a reduced wall thickness in comparison with the surrounding portion of wall 28. Instead, in the variant shown in FIG. 2B, depression 30 is characterized by a concave bend 30, pointing towards the inside of the container, in relation to the surrounding portion of wall 32.

A clamp 34 bridges over a portion of groove 22, and is affixed to wall 24 on both sides of groove 22. One skilled in the art will recognize that clamp 34 may be welded to wall 24 if both wall 24 and clamp 34 are metallic; or may be soldered; or may be adhesively bonded; or may be joined to wall 24 in a variety of other ways, all aimed at preventing the angular expansion of groove 22 by restraining the angular movement of groove 22.

In the event that pressure builds up inside container 20 beyond a predetermined limit, groove 22 will absorb such overpressure by deforming radially in shape and expanding in an outwards direction, while the angular perimeter of container 20 will remain essentially constant because the angular expansion of grove 22 will be laterally restrained by clamp 34.

Figure 3A:
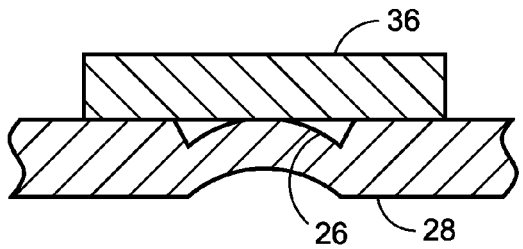
FIGS. 3A-3B are detailed views of the depressions of FIGS. 2A-2B when constrained by a clamp as in the embodiment of FIG. 1.
Figure 3B:
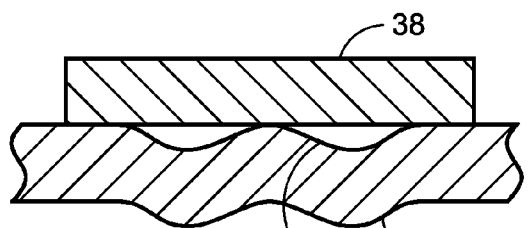

The mode of deformation of groove 22 may be understood more clearly with reference to FIGS. 3A-3B. Turning first to FIG. 3A, there is shown the deformation of the groove illustrated in FIG. 2A when the pressure inside the container exceeds a predetermined value. Groove 26 expands radially absorbing the overpressure inside the container but is eventually constrained in its outward extension by the inner surface of clamp 36. At the same time, the angular expansion of groove 26 is prevented by clamp 36, which is affixed to wall 28 on both sides of groove 26. In summary, groove 26 expands radially until it comes in contact with clamp 36, while the overall perimeter of the container remains essentially constant because the angular expansion of groove 26 is prevented by clamp 36.

Figure 2B:
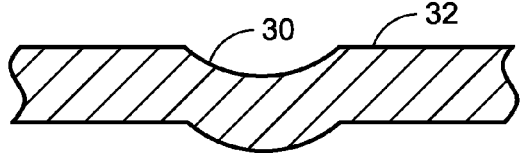

Turning now to FIG. 3B, there is shown the deformation of the groove illustrated in FIG. 2B when the pressure inside the container exceeds a predetermined value and when groove 30 is constrained by clamp 38 affixed to wall 32.

Figure 4:
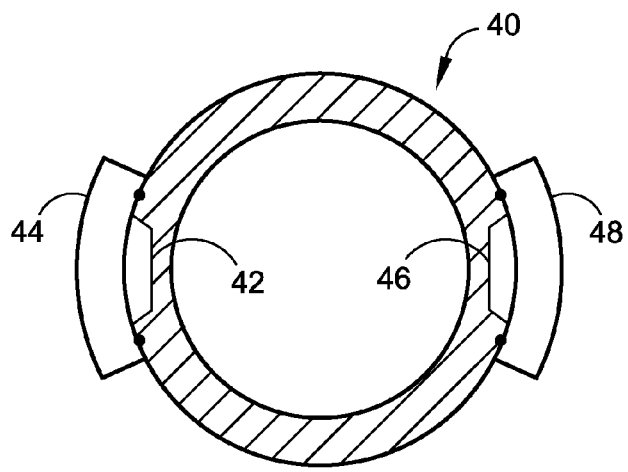
FIG. 4 is a top view of a second embodiment of the invention, wherein there are two depressions, each of which is constrained by a clamp.

In a second embodiment of the invention, more than one groove is present, and each groove is angularly spaced from the other and restrained by a clamp. FIG. 4 illustrates a variant of this embodiment, wherein two depressions 42 and 46 are positioned on container 40 in opposite radial positions to each other, and wherein each of grooves 42 and 46 is angularly constrained by one of clamps 44 and 48. This arrangement is particularly noteworthy, because it simulates the performance under overpressure of a container having a thicker wall since the stress induced by the overpressure is distributed more evenly along the radial perimeter of container 40 than in the first embodiment.

Figures 5A, 5B:
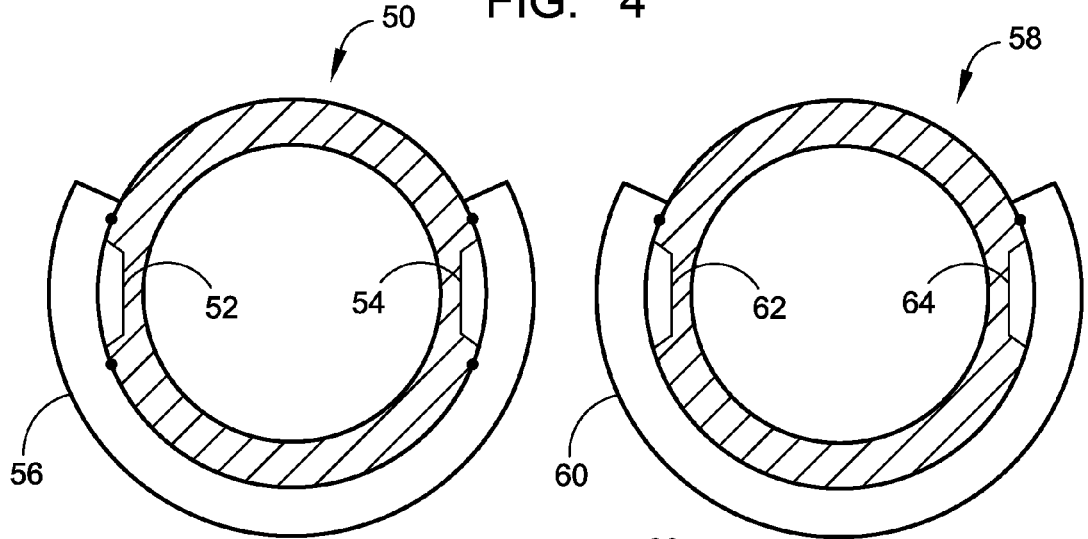

Turning now to FIGS. 5A-5B, there is shown a third embodiment of the invention, comprising two depressions 52 and 54 which are angularly constrained by a single clamp 56. More particularly, in FIG. 5A there is shown a variant of the third embodiment wherein clamp 56 may be affixed to the wall of container 50 in two or more points on each side both of depression 52 and of depression 54, and in FIG. 5B, there is shown a second variant wherein clamp 60 may be affixed to container 58 in only two points, one in the proximity of the free end of clamp 60 next to depression 62, and the other in the proximity of the free end of clamp 60 next to depression 64.

Figure 6:
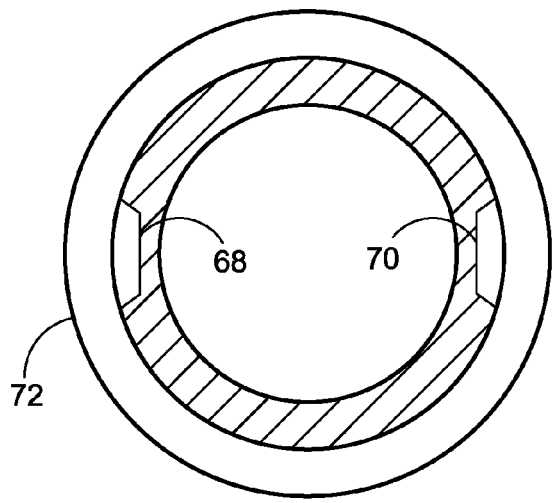
FIG. 6 is a top view of a fourth embodiment of the invention, wherein there are two depressions and a single clamp encircling the entire container and constraining both depressions.

In a fourth embodiment of the invention, illustrated in FIG. 6, a container 66 comprises two depressions 68 and 70 that are angularly spaced from each other, preferably at 180 degrees from each other. A clamp 72 surrounds the entire container 58 and may be affixed to the container by welding, soldering, adhesive bonding, or a similar process, or may even restrain the container simply by pressure interference. Even in this case, the capability of depressions 68 and 70 to expand while clamp 72 restrains the perimeter expansion of container 66 provides for a resistance to overpressure of the same level as a container having a thicker wall.

An application of a container with an overpressure safety device is capacitors, where a sudden generation of gas or gases within the capacitor may reach explosive levels. Some capacitors are designed to have tabs extending from the capacitor terminals and carrying an electrical current. In a fifth embodiment of the invention, the clamp restraining the expansion of a depression on the container wall may be constructed as a single piece with the tab.

While the invention has been described in connection with the above described embodiments, it is not intended to limit the scope of the invention to the particular forms set forth, but on the contrary, it is intended to cover such alternatives, modifications, and equivalents as may be included within the scope of the invention.

What is claimed is:

1. A container having an overpressure safety device comprising:
   a wall having a depression on at least a portion of the wall, the depression causing the at least a portion of the wall to expand prior to the remainder of the wall when the pressure inside the container exceeds a predetermined level; and
   a clamp affixed to the wall and bridging over the at least a portion of the wall, the clamp restraining the angular expansion of the depression, the clamp further causing the outer dimensions of the wall to remain essentially constant when the pressure inside the container exceeds the predetermined level while enabling the depression to expand radially in the direction of the clamp.

2. The container having an overpressure safety device of claim 1,
   wherein the container is essentially tubular in shape,
   wherein the depression is essentially shaped like a groove extending parallel to the longitudinal axis of the container, and
   wherein the clamp is essentially shaped like a bar bridging angularly over the depression, the clamp being affixed to the outer wall of the container in two or more points spaced angularly on opposite sides of the depression.

3. The container having an overpressure safety device of claim 1, wherein the depression is formed by providing the at least a portion of the wall with a lesser thickness than the remainder of the wall.

4. The container having an overpressure safety device of claim 1, wherein the depression is formed by causing the at a least a portion of the wall to have a concave profile in relation to the outer surface of the container.

5. The container having an overpressure safety device of claim 1, wherein the clamp is affixed to the wall by a process selected from the group consisting of welding, soldering, and adhesive bonding.

6. The container having an overpressure safety device of claim 1, wherein the clamp extends to wrap the majority of the angular perimeter of the container.

7. The container having an overpressure safety device of claim 1, wherein there are a plurality of depressions, each of the depressions being bridged over by a clamp affixed to the outer surface of the wall.

8. The container having an overpressure safety device of claim 7, wherein there are two depressions that are angularly separated 180 degrees.

9. The container having an overpressure safety device of claim 7, wherein there are two depressions positioned on opposite sides of the container, each of the depressions being bridged over by a single clamp wrapping around at least a portion of the container, the single clamp being affixed to the wall of the container in two or more points spaced angularly on opposite sides of each depression.

10. The container having an overpressure safety device of claim 9, wherein the single clamp is affixed to the wall of the container in two points, one of the two points being situated in the proximity of one of the free ends of the clamp and the other point being situated in the proximity of the other free end of the clamp.

11. The container having an overpressure safety device of claim 1, wherein the container encloses an electric capacitor and comprises a positive terminal and a negative terminal, wherein each of the terminals has a conductive tab extending from the terminal and suited for carrying electrical current, and wherein the clamp is built integrally with the one of the tabs.

12. A container having an overpressure safety device comprising:
   a wall having a depression in at least a portion of the wall, the depression causing the at least a portion of the wall to expand prior to the remainder of the wall when the pressure inside the container exceeds a predetermined level; and
   a clamp wrapped around the wall and bridging over the depression, the clamp restraining the angular expansion of the depression and causing the outer dimensions of the wall to remain essentially constant when the pressure inside the container exceeds the predetermined level while enabling the depression to expand radially in the direction of the clamp.

13. The container having an overpressure safety device of claim 12, wherein the container is essentially tubular in shape, wherein the depression is essentially shaped like a groove extending parallel to the longitudinal axis of the container, and wherein the clamp wraps angularly over the depression around the entire angular perimeter.

14. The container having an overpressure safety device of claim 12, wherein the clamp is interference fit with the wall.

15. The container having an overpressure safety device of claim 12, wherein the clamp is affixed to the wall.

16. The container having an overpressure safety device of claim 14, wherein the clamp is affixed to the wall by a process selected from the group consisting of welding, soldering, and adhesive bonding.

* * * * *